M. OKADA.
CRACKLED GLASS DIAMOND.
APPLICATION FILED AUG. 28, 1915.
1,219,853.
Patented Mar. 20, 1917.
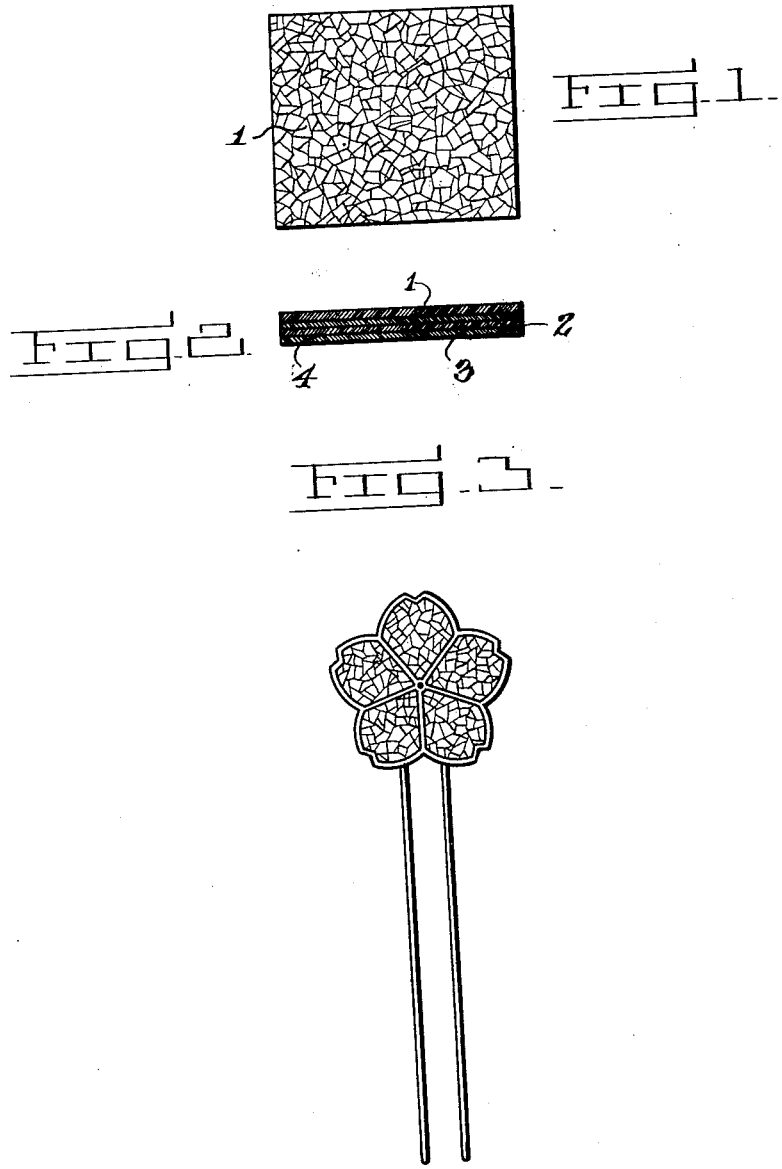
Witness
Chr. Nielsen Jr.
Inventor.
Mokichi Okada,
H L Woodward
Attorney.

UNITED STATES PATENT OFFICE.

MOKICHI OKADA, OF TOKYO, JAPAN.

CRACKLED-GLASS DIAMOND.

1,219,853.

Specification of Letters Patent.  Patented Mar. 20, 1917.

Application filed August 28, 1915. Serial No. 47,904.

*To all whom it may concern:*

Be it known that I, MOKICHI OKADA, residing at No. 17 Minamimaki Cho, Kyobashi Ku, city of Tokyo, Empire of Japan, have invented certain new and useful Improvements in Crackled-Glass Diamonds, of which the following is the specification.

This invention relates to a crackled glass diamond which consists of a thin glass sheet coated with an amalgam and crackled after pasting it on a piece of cloth or paper. The object of the invention is to prepare a material which, being cracked, can be pasted on a convex surface and will give a brilliant effect something like that of diamond.

It is an object to give a method of preparing a glass mosaic which will involve a minimum expenditure of time and labor in its production, and which may be produced at a low cost. It is also an important object to assure an accurate mortising or fitting of the parts in such a mosaic.

My invention is particularly desirable in the making of articles of jewelry, although it may be applied as well to decoration of various objects and structures.

Additional objects and advantages will appear from the disclosures herein.

In the accompanying drawings,

Figure I is a surface view, and Fig. II a sectional view, of the crackled glass prepared according to my invention;

Fig. III shows an example of its application to an article of jewelry.

This invention consists of a thin sheet of glass (1) which is coated on one side with an amalgam (2) (sometimes the glass may be coated with pigment before applying the amalgam), and then pasted on a piece of cloth or paper (4) with a suitable adhesive (3). Before the adhesive is perfectly dry, the glass is broken into small pieces, so that it is covered with crackles. This breaking of the glass may be accomplished in various ways, as, for instance, by laying the glass upon a flat surface covered with a piece of cloth, the adhering cloth disposed upwardly, and then pressing upon the cloth over the glass with some hard rounded object, or by rolling a small sharp edged wheel back and forth upon the back of the cloth secured to the glass while sufficient pressure is exerted to properly crackle the glass.

The cloth with the crackled glass adhering thereto may then be cemented upon any suitable supporting surface, preferably a convex one, as in that case light is refracted at widely various angles. It may, however, be applied to flat or concave surfaces, if desired.

When glass thus prepared is applied for ornamental purpose, especially on a convex surface, the cracked pieces reflect and refract light and give a very brilliant effect.

Having now fully described my invention and the manner of carrying the same into effect, what I claim as new and desire to secure by Letters Patent, is—

1. An article of manufacture comprising a thin sheet of glass secured to a backing of reflecting material, and having a flexible support secured evenly upon the rear surface of the reflecting material, said support being bent variously, so that the glass is covered with fine crackles, substantially as shown, and for the purposes indicated.

2. The method of decoration consisting in securing a frangible refractive body upon a flexible element, subjecting the two to such flexure as to crackle the refractive body, and securing the flexible element upon a support.

3. The method of preparing a decorative device consisting in securing a thin sheet of glass to a piece of flexible material by adhesive and before the adhesive is set subjecting the glass to strains resulting in crackling it.

In testimony whereof I affix my signature in presence of two witnesses.

MOKICHI OKADA.

Witnesses:
  KINNOSUKE SUGITA,
  HAROLD C. HUGGINS.